(12) United States Patent
Hayashi

(10) Patent No.: US 8,534,874 B2
(45) Date of Patent: Sep. 17, 2013

(54) HEAT DISSIPATION MEMBER, ELECTRO-OPTICAL DEVICE, AND ELECTRONIC APPARATUS

(75) Inventor: Tomohiro Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 13/080,188

(22) Filed: Apr. 5, 2011

(65) Prior Publication Data

US 2011/0249444 A1    Oct. 13, 2011

(30) Foreign Application Priority Data

Apr. 7, 2010    (JP) ................... 2010-088383

(51) Int. Cl.
  *F21V 29/00*    (2006.01)
  *H05K 7/20*    (2006.01)
  *F28F 7/00*    (2006.01)

(52) U.S. Cl.
  USPC ........... 362/294; 361/697; 361/703; 165/80.3

(58) Field of Classification Search
  USPC ................ 362/294; 165/80.3; 361/697, 703
  See application file for complete search history.

(56) References Cited

U.S. PATENT DOCUMENTS

| | | | | |
|---|---|---|---|---|
| 5,170,194 A | * | 12/1992 | Kurematsu et al. | 353/52 |
| 6,845,812 B2 | * | 1/2005 | Turocy et al. | 165/80.3 |
| 6,942,025 B2 | * | 9/2005 | Nair et al. | 165/185 |
| 7,215,545 B1 | * | 5/2007 | Moghaddam et al. | 361/699 |
| 7,712,926 B2 | * | 5/2010 | Matheson | 362/294 |
| 8,282,247 B2 | * | 10/2012 | Ivey et al. | 362/294 |
| 2005/0201107 A1 | * | 9/2005 | Seki | 362/373 |
| 2009/0231555 A1 | * | 9/2009 | Nagarekawa et al. | 353/99 |
| 2010/0271782 A1 | | 10/2010 | Miyashita | |
| 2010/0271783 A1 | | 10/2010 | Miyashita | |

FOREIGN PATENT DOCUMENTS

| | | |
|---|---|---|
| JP | 2007-298615 A | 11/2007 |
| JP | 2008-015386 A | 1/2008 |
| JP | 2010-014809 A | 1/2010 |
| JP | 2010-256653 A | 11/2010 |
| JP | 2010-256654 A | 11/2010 |
| JP | 2010-256655 A | 11/2010 |

* cited by examiner

*Primary Examiner* — David J Makiya

(74) *Attorney, Agent, or Firm* — ALG Intellectual Property, LLC

(57) ABSTRACT

A heat dissipation member is disposed opposing a reflective light modulation element, and includes: a heat receiving surface that receives heat from the element; a heat dissipation surface; and heat dissipation fins that protrude from the heat dissipation surface. The fins are formed so that the density at which the fins are disposed is greater at the center area of the heat dissipation surface than at the end areas of the heat dissipation surface, or are formed so that the cross-sectional surface area of the fins is greater at the center area of the heat dissipation surface than at the end areas of the heat dissipation surface.

9 Claims, 5 Drawing Sheets

HEAT DISSIPATION MEMBER, ELECTRO-OPTICAL DEVICE, AND ELECTRONIC APPARATUS

Japanese Patent Application No. 2010-088383, filed Apr. 7, 2010 is incorporated by reference in its entirety herein.

BACKGROUND

1. Technical Field

The present invention relates to heat dissipation members, electro-optical devices, and electronic apparatuses.

2. Related Art

Recent years have seen an increase in the demand for higher-luminosity projected images from projectors that use reflective liquid crystal elements (reflective liquid crystal panels). Although increasing the luminosity of the light source can be considered as one way of meeting this demand, doing so also increases the temperature of the reflective liquid crystal panel. In particular, the light sources used for such applications often do have only an uniform power distribution, and thus the temperature in the center area of the reflective liquid crystal panel (that is, the panel center) becomes hotter than the outer edge areas (that is, the panel outer edges), which dissipate heat more easily. When such a temperature distribution occurs, the liquid crystals in the panel center degrade at a faster rate than the liquid crystals in the panel outer edges, which can lead to the occurrence of color unevenness. Accordingly, various techniques have been considered in order to solve such a problem (for example, JP-A-2010-14809).

In JP-A-2010-14809, a thermally-conductive filling material disposed between the reflective liquid crystal panel and a heat dissipation portion is filled in a location on the back surface of the reflective liquid crystal panel that corresponds to a display region, and the heat from the entire display region is absorbed by the thermally-conductive filling material. Furthermore, the surface of the heat dissipation member that opposes the reflective liquid crystal panel is curved in a convex shape so that the center area of the heat dissipation member is closer to the reflective liquid crystal panel. The gap from the heat dissipation member in the center of the display region (a center gap) is smaller than the gaps from the heat dissipation member at the edges of that region (edge gaps) and the heat receiving efficiency of the heat dissipation member is greater in the center area than in the edge areas; in such a manner, the configuration attempts to make the temperature distribution uniform.

However, with JP-A-2010-14809, the thermally-conductive filling material is filled across the entirety of the display region, and thus there is almost no difference in the heat receiving efficiency throughout the display region. Furthermore, because the reflective liquid crystal panel is extremely small, providing the heat dissipation member with a curved surface results in only an extremely small difference between the center gap and the edge gaps. Accordingly, there is a problem in that there are almost no differences in the heat receiving efficiencies throughout the display region caused by the thermally-conductive filling material and the heat dissipation portion, and thus it is not possible to make the temperature distribution sufficiently uniform throughout that region.

SUMMARY

An advantage of some aspects of the invention is to provide a heat dissipation member, an electro-optical device, and an electronic apparatus that make the temperature distribution throughout a display region uniform using a simple configuration.

A heat dissipation member according to an aspect of the invention is disposed opposing a reflective light modulation element, and includes: a heat receiving surface, disposed opposing the reflective light modulation element, that receives heat from the reflective light modulation element; a heat dissipation surface located on the opposite side as the heat receiving surface; and multiple heat dissipation fins that protrude from the heat dissipation surface. The multiple heat dissipation fins are formed so that the density at which the multiple heat dissipation fins are disposed, when viewed along any of the cross-sections of the heat dissipation fins that are orthogonal to the heat dissipation surface, is greater at the center area of the heat dissipation surface than at the end areas of the heat dissipation surface, or are formed so that the cross-sectional surface area of the multiple heat dissipation fins, when viewed along the cross-section that is orthogonal to the direction in which the heat dissipation fins protrude, is greater at the center area of the heat dissipation surface than at the end areas of the heat dissipation surface.

According to this aspect of the invention, multiple heat dissipation fins are erected on the heat dissipation surface. The multiple heat dissipation fins are formed so that the density at which the multiple heat dissipation fins are disposed, when viewed along any of the cross-sections of the heat dissipation fins that are orthogonal to the heat dissipation surface, is greater at the center area of the heat dissipation surface than at the end areas of the heat dissipation surface, or are formed so that the cross-sectional surface area of the multiple heat dissipation fins, when viewed along the cross-section that is orthogonal to the direction in which the heat dissipation fins protrude, is greater at the center area of the heat dissipation surface than at the end areas of the heat dissipation surface. In other words, the heat dissipation fins are formed so that the surface area thereof at the center area of the heat dissipation surface is greater than at the end areas of the heat dissipation surface, thus increasing the heat dissipation efficiency. Therefore, more heat can be received in the center area of the heat receiving surface corresponding to the center area of the heat dissipation surface, which makes it possible to increase the heat receiving efficiency at the center area of the display region, which experiences higher temperatures, beyond that of the end areas of that region. Accordingly, the temperature distribution throughout the display region becomes uniform, which makes it possible to suppress degradation of the reflective light modulation element due to high temperatures and thus suppress problems such as the occurrence of color unevenness.

In the heat dissipation member according to another aspect of the invention, it is preferable for the multiple heat dissipation fins to be formed so that the height of the heat dissipation fins in the direction in which the heat dissipation fins protrude is, when viewed along any cross-section that is orthogonal to the heat dissipation surface, greater at the center area of the heat dissipation surface than at the end areas of the heat dissipation surface.

According to this aspect of the invention, the heat dissipation fins can be formed so that the surface area thereof is greater at the center area of the heat dissipation surface than at the end areas of the heat dissipation surface, using a simple configuration in which the height dimensions are simply changed.

In the heat dissipation member according to another aspect of the invention, it is preferable for auxiliary heat dissipation fins to be erected on the outside of the heat dissipation surface.

According to this aspect of the invention, auxiliary heat dissipation fins are provided on the outside of the heat dissipation surface, and thus heat is also dissipated from the auxiliary heat dissipation fins when the heat dissipation of the heat dissipation fins is insufficient; this makes it possible to increase the heat dissipation efficiency.

An electro-optical device according to another aspect of the invention includes: a reflective light modulation element configured by disposing a pair of substrates in opposition to each other; and one of the aforementioned heat dissipation members.

According to this aspect of the invention, the electro-optical device includes the heat dissipation member according to one of the aforementioned aspects of the invention; this makes the temperature distribution throughout the display region uniform, which makes it possible to suppress degradation of the liquid crystals due to high temperatures and thus suppress problems such as the occurrence of color unevenness.

An electronic apparatus according to an aspect of the invention includes the electro-optical device described above.

According to this aspect of the invention, the electronic apparatus includes the electro-optical device according to the aforementioned aspects of the invention, and is thus capable of displaying a projected image in which color unevenness has been suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
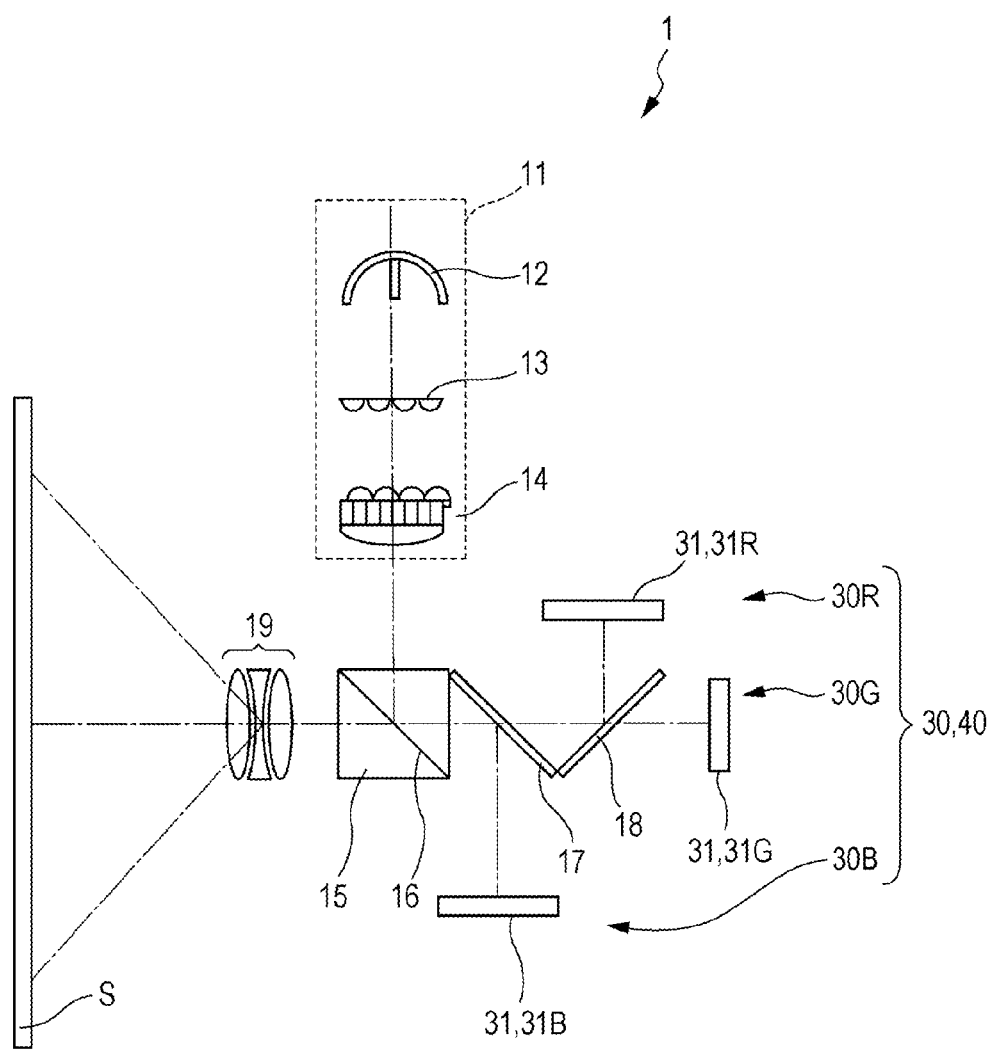
FIG. 1 is a diagram illustrating the configuration of a projector according to a first embodiment, a second embodiment, and a variation on the invention.

Hereinafter, embodiments of the invention will be described based on the drawings.
First Embodiment
Projector Configuration FIG. 1 is a diagram schematically illustrating the general configuration of a projector 1.

The projector 1 forms a color image (image light) by modulating light beams emitted from a light source based on image information, and enlarges and projects that color image onto a screen S.

This projector 1 includes: a light source 12; a polarized illumination device 11 provided with an integrator lens 13 and a polarization modulation element 14; a polarizing beam splitter 15 that reflects, using an S-polarized light beam reflective surface 16, an S-polarized light beam emitted from the polarized illumination device 11; a dichroic mirror 17 that separates the blue light (B) component from the light reflected by the S-polarized light beam reflective surface 16 of the polarizing beam splitter 15; and a dichroic mirror 18 that reflects and separates the red light (R) component from the light beam after the blue light has been separated. The projector 1 also includes three reflective electro-optical devices 30 serving as electro-optical devices into which light of the respective colors enters (where the red-light reflective electro-optical device is assigned the reference numeral 30R, the green-light reflective electro-optical device is assigned 30G, and the blue light reflective electro-optical device is assigned 30B).

The three reflective electro-optical devices 30 each include reflective liquid crystal panels 31 (like the reflective electro-optical devices 30, the reflective liquid crystal panels for the respective colors of light are assigned the reference numerals 31R, 31G, and 31B, respectively) serving as reflective liquid crystal elements, where liquid crystals have been formed upon a light-transmissive substrate such as silica or glass, or a silicon substrate, which is known as LCOS (Liquid Crystal On Silicon). Each of the reflective electro-optical devices 30 is disposed so that the respective reflective liquid crystal panels 31 are approximately orthogonal to the optical axis of the light beams that pass through the dichroic mirrors 17 and 18.

In the reflective liquid crystal panels 31, the orientation of the liquid crystals is controlled in accordance with a driving signal from a control device (not shown), thus modulating the deflection direction of the incident light and reflecting the light toward the dichroic mirrors 17 and 18.

Note that the reflective electro-optical devices 30 also include, in addition to the reflective liquid crystal panels 31, heat dissipation members 35 (not shown in FIG. 1) and thermal conductive members 38 (also not shown in FIG. 1), and the details of this configuration will be described later.

The projector 1 then combines the light modulated by the three reflective electro-optical devices 30R, 30G, and 30B using the dichroic mirrors 17 and 18 and the polarizing beam splitter 15, and projects this combined light onto the screen S through a projection lens 19.

Detailed Configuration of Reflective Electro-optical Device

Figure 2:
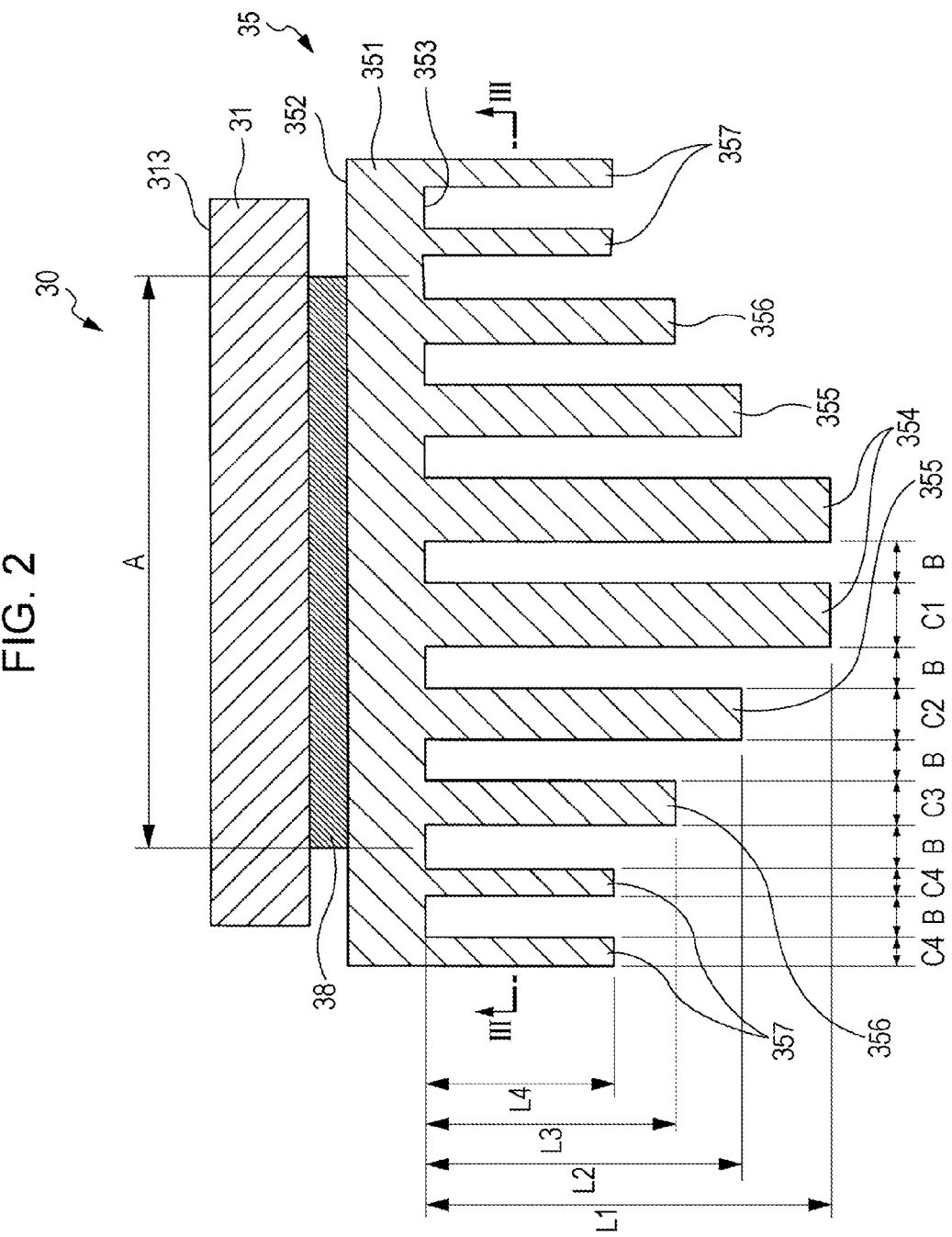
FIG. 2 is a cross-sectional view of a reflective electro-optical device according to a first embodiment.
Figure 3:
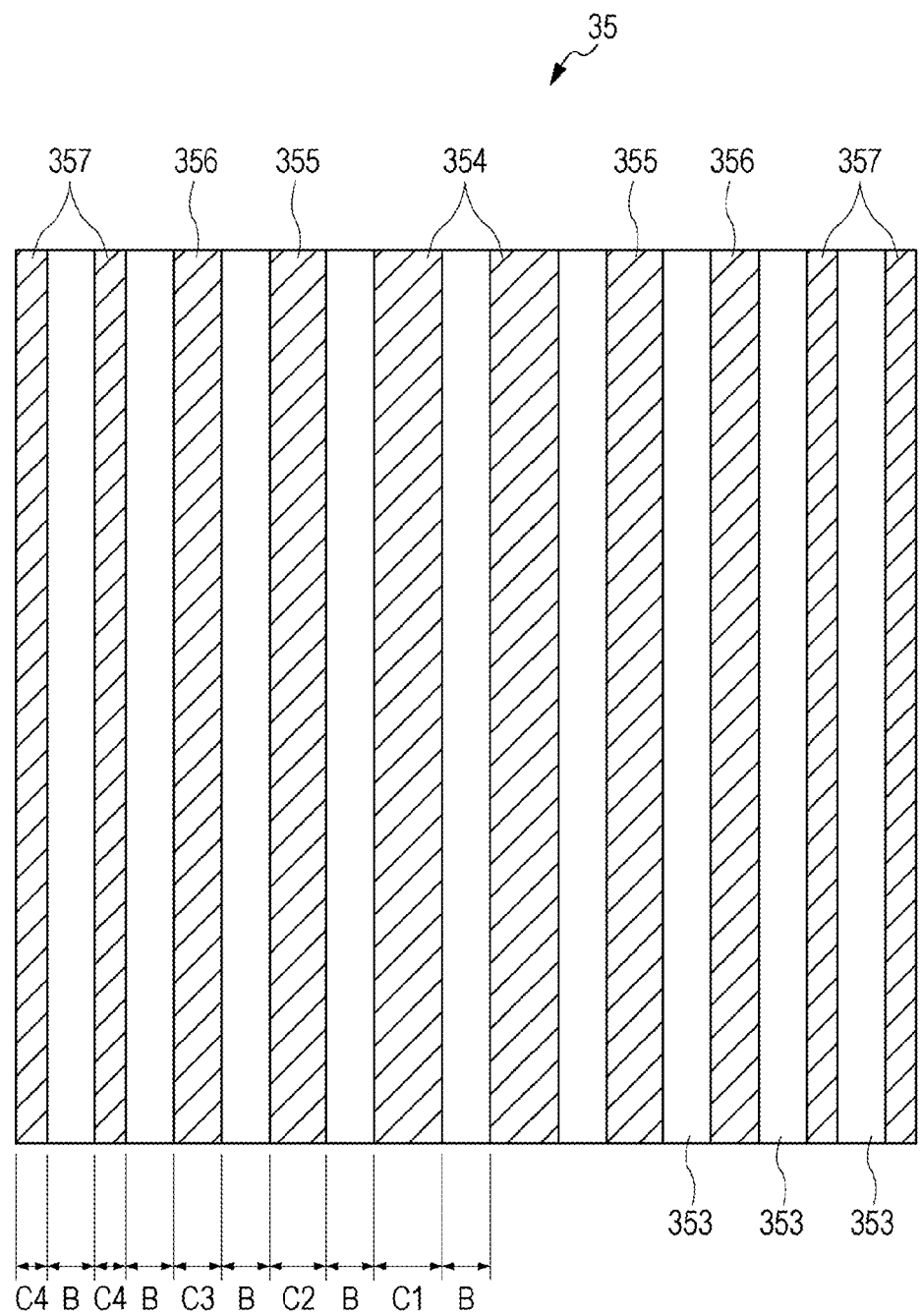
FIG. 3 is a cross-sectional view taken along the III-III line shown in FIG. 2.

FIG. 2 is a cross-sectional view illustrating the structure of the reflective electro-optical device 30. FIG. 3 is a cross-sectional view taken along the III-III line shown in FIG. 2.

Although not shown in the drawings, the reflective liquid crystal panel 31 of which the reflective electro-optical device 30 is configured includes a reflective substrate, a light-transmissive substrate disposed opposing the reflective substrate, and liquid crystals encapsulated and sealed between the two substrates. This reflective liquid crystal panel 31 displays an image in a display region 313 having a width dimension A by modulating incident light entering from the opposing substrate (the upward direction in FIG. 2) based on image information.

Meanwhile, the reflective electro-optical device 30 includes a heat dissipation member 35 formed of, for example, a metal having a high thermal conductivity such as aluminum, and disposed opposing the rear surface of the reflective liquid crystal panel 31.

This heat dissipation member 35 includes an approximately plate-shaped heat receiving portion 351 whose planar shape is larger than that of the reflective liquid crystal panel 31. The heat receiving portion 351 includes a heat receiving surface 352 that opposes the reflective liquid crystal panel 31 and a heat dissipation surface 353 on the opposite side as the heat receiving surface 352. Two each of first, second, and third heat dissipations fins 354, 355, and 356, protruding in approximately plate shapes whose dimensions are equal in the vertical direction in FIG. 2, are provided in the heat dissipation surface 353 in a region corresponding to the display region 313 (a heat dissipation acceleration region).

The first, second, and third heat dissipation fins 354, 355, and 356 are provided so as to be horizontally symmetrical in that order from the center of the heat dissipation acceleration region. Furthermore, the first, second, and third heat dissipation fins 354, 355, and 356 are disposed at equal intervals B, and are formed so that their respective width dimensions C1, C2, and C3 decrease in that order and their respective length dimensions L1, L2, and L3 decrease in that order. In other words, the fins are provided so that both the width and length dimensions thereof are greater at the center of the heat dissipation acceleration region (a heat dissipation acceleration center area) than at the ends of the heat dissipation acceleration region (heat dissipation acceleration end areas). Accordingly, the surface area of the heat dissipation fins is set so as to be greater at the heat dissipation acceleration center area than at the heat dissipation acceleration end areas.

In addition, four auxiliary heat dissipation fins 357, having an approximately plate shape whose dimensions in the vertical direction in FIG. 2 are the same as the first heat dissipation fin 354, are provided on the outer sides of the heat dissipation acceleration region in the heat dissipation surface 353. Each of the auxiliary heat dissipation fins 357 are provided so that their distance from the third heat dissipation fin 356 and from the adjacent auxiliary heat dissipation fins 357 are both equal to an interval B. Furthermore, the auxiliary heat dissipation fins 357 are formed so that the width dimensions C4 and length dimensions L4 thereof are smaller than those of the third heat dissipation fin 356.

The heat dissipation member 35 is anchored to the reflective liquid crystal panel 31 with the thermal conductive member 38, configured of silicon or the like and having thermal conductivity, therebetween. Specifically, the thermal conductive member 38 is provided on the rear surface of the heat receiving surface 352 and the reflective liquid crystal panel 31 in a location that corresponds to the display region 313.

Effects of First Embodiment

According to the aforementioned first embodiment, the following effects can be achieved.

The width dimensions and length dimensions of the first through third heat dissipation fins 354 to 356 change so that those dimensions are greater at the heat dissipation acceleration center area than at the heat dissipation acceleration end areas, the surface areas of the first through third heat dissipation fins 354 to 356 change in the same manner. The heat dissipation efficiency increases as the surface area of the heat dissipation fin increases, and thus more heat can be received in the region of the heat receiving surface 352 corresponding to the first heat dissipation fin 354; this makes it possible to increase the heat receiving efficiency in the center of the display region 313, which experiences high temperatures, beyond that at the ends of that region. Accordingly, the temperature distribution throughout the display region 313 can be made uniform, which makes it possible to suppress degradation of the liquid crystals due to high temperatures and thus suppress the occurrence of color unevenness.

Furthermore, because the auxiliary heat dissipation fins 357 are provided, heat dissipation can be accelerated outside of the heat dissipation acceleration region as well, thus making it possible to improve the heat dissipation efficiency.

Second Embodiment

Next, a second embodiment of the invention will be described.

Note that a reflective electro-optical device 40 according to the second embodiment is installed in place of the reflective electro-optical device 30 according to the first embodiment as shown in FIG. 1.

Figure 4:
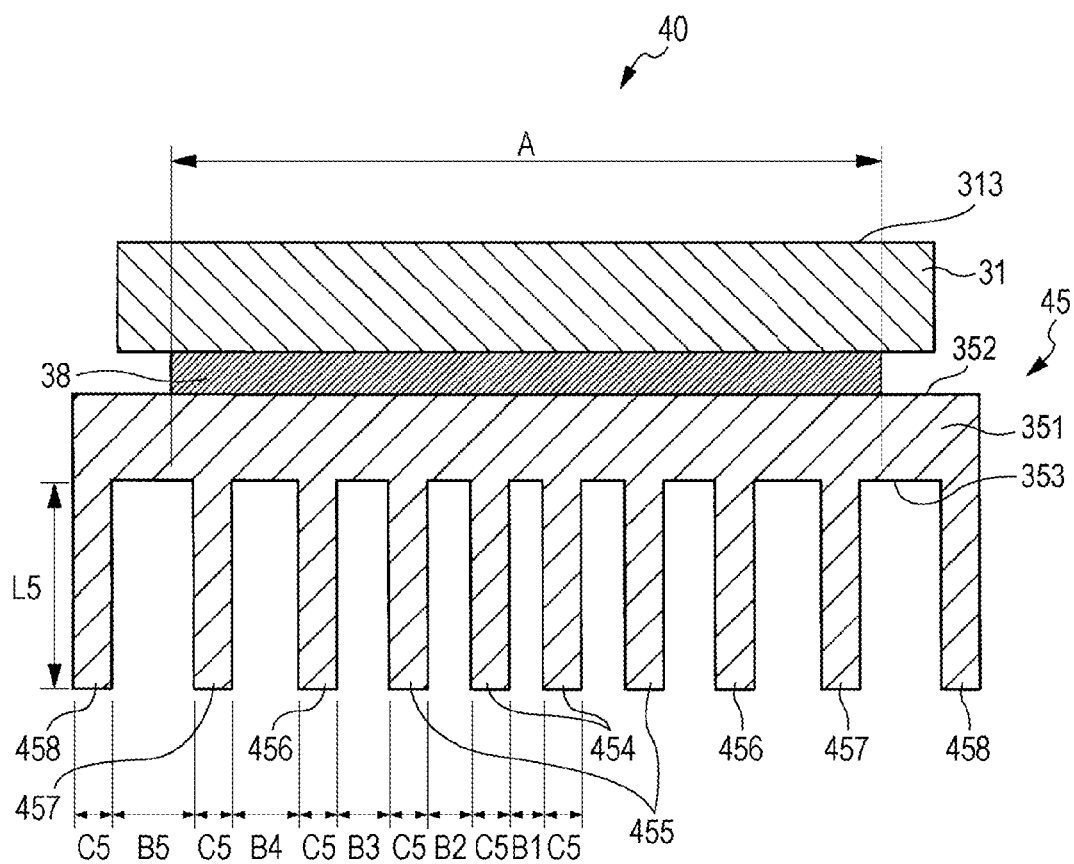
FIG. 4 is a cross-sectional view of a reflective electro-optical device according to a second embodiment.

FIG. 4 is a cross-sectional view illustrating the structure of the reflective electro-optical device 40.

Note that the basic structure of the second embodiment is the same as that of the first embodiment, and thus common elements will be assigned the same reference numerals, and descriptions thereof will be omitted.

As shown in FIG. 4, a heat dissipation member 45 of the reflective electro-optical device 40 includes the heat receiving portion 351. Two each of first, second, third, and fourth heat dissipation fins 454, 455, 456, and 457, each protruding in an approximately plate shape, are provided in the heat dissipation acceleration region of the heat dissipation surface 353 of this heat receiving portion 351.

The first, second, third, and fourth heat dissipation fins 454, 455, 456, and 457 are formed in shapes in which the dimension in the vertical direction thereof shown in FIG. 4, the width dimension C5, and the length dimension L5 are the same for each fin, and are horizontally symmetrical in that order from the center of the heat dissipation acceleration region. Furthermore, an interval B1 between the two first heat dissipation fins 454, an interval B2 between the first heat dissipation fin 454 and the second heat dissipation fin 455, an interval B3 between the second heat dissipation fin 455 and the third heat dissipation fin 456, and an interval B4 between the third heat dissipation fin 456 and the fourth heat dissipation fin 457 are set so as to increase in that order. In other words, the surface area of the heat dissipation fins is set to be greater at the heat dissipation acceleration center area than at the heat dissipation acceleration end areas by changing the pitch at which the first through fourth heat dissipation fins 454 to 457, which have the same shape, are disposed.

In addition, two auxiliary heat dissipation fins 458 are provided on the outer sides of the heat dissipation acceleration region in the heat dissipation surface 353. These auxiliary heat dissipation fins 458 are formed in the same shape as the stated first through fourth heat dissipation fins 454 to 457, and the interval B5 between the auxiliary heat dissipation fins 458 and the fourth heat dissipation fins 457 is set so as to be greater than the stated interval B4.

Effects of Second Embodiment

In addition to the same effects as those described in the aforementioned first embodiment, the following effects can be achieved by the stated second embodiment.

That is, the heat dissipation efficiency at the heat dissipation acceleration center area is increased by setting the first through fourth heat dissipation fins 454 to 457 and the auxiliary heat dissipation fins 458 to the same length dimension L5 and changing the pitch at which those fins are disposed, thus making it possible to suppress an increase in the height of the heat dissipation member 45.

Variations

Note that the invention is not limited to the aforementioned embodiments, and variations, improvements, and so on that fall within the scope of the advantages of the invention are also included as part of the invention.

First Variation

Figure 5:
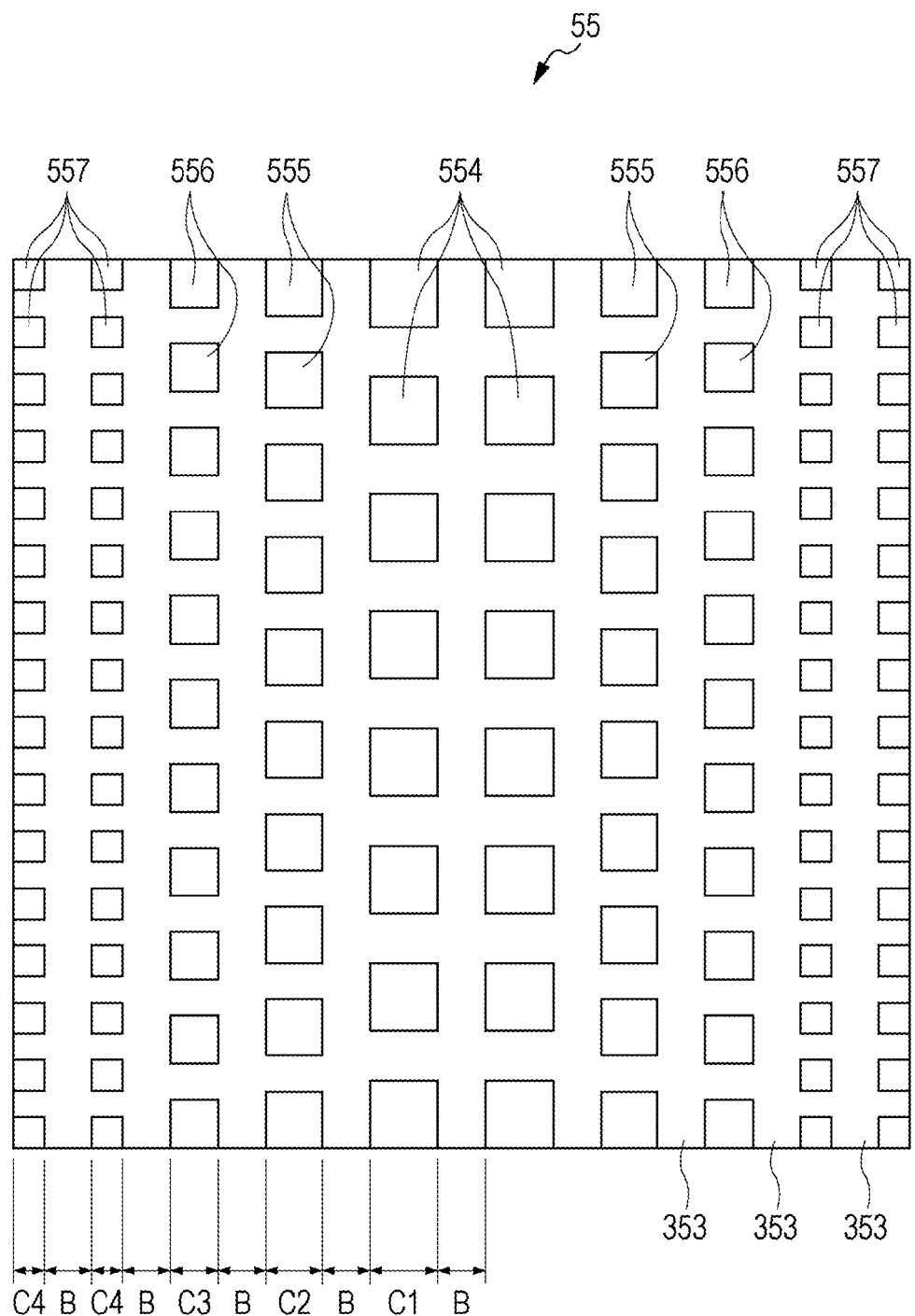
FIG. 5 is a plan view of a heat dissipation member according to a first variation as seen from the normal line direction of a heat dissipation portion.

FIG. 5 is a plan view of a heat dissipation member 55 according to a variation on the first embodiment of the invention, as seen from the normal line direction of the heat dissipation surface 353. In this variation, column-shaped first through third heat dissipation fins 554 to 556 and auxiliary heat dissipation fins 557 are provided at identical intervals B instead of the plate-shaped first through third heat dissipation fins 354 to 356 and auxiliary heat dissipation fins 357 of the first embodiment. The cross-sections taken orthogonal to the direction in which the first through third heat dissipation fins 554 to 556 and the auxiliary heat dissipation fins 557 protrude have the same length dimensions as the width dimensions C1, C2, C3, and C4 of the respective heat dissipation fins 354 to 357 in the first embodiment on one side that form square shapes. This variation also allows the surface area of the heat dissipation fins to be set so that the heat dissipation acceleration center area is greater than the heat dissipation acceleration end areas, which makes it possible to achieve the same effects as the aforementioned first embodiment.

Other Variations

The cross-sections of the stated heat dissipation fins 554 to 557 are not limited to a square shape; a circle or other polygons aside from a square may be employed as well.

Furthermore, the heat dissipation fins 454 to 458 in the second embodiment may have a column shape, as in the first variation.

Although the heat dissipation fins 354 to 357 of the first embodiment have length dimensions of L1 to L4, respectively, and have rectangular plate shapes whose dimensions in the vertical direction shown in FIG. 2 are equal, the invention may be such that the fins are plate-shape bodies whose heights in the vertical direction shown in FIG. 2 change so that a mountain shape, where the heat dissipation acceleration center area is higher than the heat dissipation acceleration end areas.

What is claimed is:

1. A heat dissipation member disposed opposing a reflective light modulation element, the heat dissipation member comprising:
   a heat receiving surface, disposed opposing a rear surface of the reflective light modulation element, that receives heat from the reflective light modulation element;
   a heat dissipation surface located on the opposite side of the heat receiving surface; and
   multiple heat dissipation fins that protrude from the heat dissipation surface, each fin of the multiple heat dissipation fins protruding in an approximately plate shape;
   wherein the multiple heat dissipation fins are formed so that the density at which the multiple heat dissipation fins are disposed, when viewed along a cross-section of heat dissipation fins among the multiple heat dissipation fins that is orthogonal to the direction in which the heat dissipation fins protrude, is greater at a center area of the heat dissipation surface than at an end area of the heat dissipation surface,
   the heat dissipation fins are disposed at equal intervals, and width dimensions of the heat dissipation fins decrease from the center area of the heat dissipation surface to the end area of the heat dissipation surface.

2. The heat dissipation member according to claim 1,
   wherein the multiple heat dissipation fins are formed so that the length of the heat dissipation fins in the direction in which the heat dissipation fins protrude is greater at the center area of the heat dissipation surface than at the end areas of the heat dissipation surface.

3. The heat dissipation member according to claim 1, further comprising:
   auxiliary heat dissipation fins disposed on the outside of the heat dissipation surface.

4. An electro-optical device comprising:
   a reflective light modulation element configured by disposing a pair of substrates in opposition to each other; and
   the heat dissipation member according to claim 1.

5. An electronic apparatus comprising the electro-optical device according to claim 4.

6. The heat dissipation member according to claim 1, further comprising a thermal conductive member disposed between the heat dissipation member and the reflective light modulation element.

7. The heat dissipation member according to claim 6, wherein the heat receiving surface receives heat from the reflective light modulation element by conduction via the thermal conductive member.

8. A heat dissipation member opposing to a reflective light modulation element, the heat dissipation member comprising:
   a first surface opposing to the reflective light modulation element via a thermal conductive member;
   a second surface opposing to the first surface; and
   a plurality of heat dissipation fins that protrude from the second surface,
   wherein a density of the plurality of heat dissipation fins at a center area of the second surface is greater than a density of the plurality of heat dissipation fins at an end area of the second surface,
   wherein heat dissipation fins among the plurality of heat dissipation fins are disposed at equal intervals, and width dimensions of the heat dissipation fins decrease from the center area of the second surface to the end area of the second surface.

9. A heat dissipation member anchored to a reflective light modulation element, the heat dissipation member comprising:
   a heat receiving surface, disposed opposing a rear surface of the reflective light modulation element, that receives heat from the light modulation element;
   a heat dissipation surface located at a side of the heat dissipation member that is opposite to the heat receiving surface; and
   multiple heat dissipation fins protruding from the heat dissipation surface, each of the multiple heat dissipation fins protruding in an approximately plate shape,
   wherein heat dissipation fins among the multiple heat dissipation fins are disposed at equal intervals and width and length dimensions of the multiple heat dissipation fins are greater at a center area of the heat dissipation surface than at an end area of the heat dissipation surface.

* * * * *